United States Patent
Date et al.

(10) Patent No.: US 8,649,623 B2
(45) Date of Patent: Feb. 11, 2014

(54) ENCODING APPARATUS AND ENCODING METHOD

(75) Inventors: Naoto Date, Kawasaki (JP); Shinichiro Koto, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/613,796

(22) Filed: Sep. 13, 2012

(65) Prior Publication Data

US 2013/0011075 A1   Jan. 10, 2013

Related U.S. Application Data

(63) Continuation of application No. PCT/JP2010/054773, filed on Mar. 19, 2010.

(51) Int. Cl.
*G06K 9/36*   (2006.01)

(52) U.S. Cl.
USPC .......................................... 382/238

(58) Field of Classification Search
USPC ................. 382/232, 236, 238, 250–253; 375/240–240.23; 348/400–408, 348/411–412, 415–416, 420–422
See application file for complete search history.

(56) References Cited

U.S. PATENT DOCUMENTS

| 5,475,501 | A  |   | 12/1995 | Yagasaki |         |
| 6,621,934 | B1 | * | 9/2003  | Yu et al. ........................ | 382/252 |
| 8,428,142 | B2 | * | 4/2013  | Johar et al. ............... | 375/240.24 |

FOREIGN PATENT DOCUMENTS

| JP | 4-225694     | 8/1992 |
| JP | 5-95542 A    | 4/1993 |
| JP | 2005-123737 A | 5/2005 |
| JP | 2010-4514 A  | 1/2010 |

OTHER PUBLICATIONS

International Search Report mailed on Jun. 15, 2010, issued for International Application No. PCT/JP2010/054773, filed on Mar. 19, 2010 (with English translation).

International Written Opinion mailed on Jun. 15, 2010, issued for International Application No. PCT/JP2010/054773, filed on Mar. 19, 2010.

* cited by examiner

*Primary Examiner* — Jose Couso
(74) *Attorney, Agent, or Firm* — Oblon, Spivak, McClelland, Maier & Neustadt, L.L.P.

(57) ABSTRACT

According to one embodiment, an encoding apparatus includes a first quantizer, a second quantizer, a predictor and a calculator. The first quantizer quantizes an input block to obtain a first quantized block. The second quantizer quantizes a reference pixel to obtain at least one quantized value. The predictor predicts each target pixel in the first quantized block using the at least one quantized value and a quantized value of a pixel that is to be decoded preceding the target pixel in decoding order in the first quantized block to obtain a second quantized block. The calculator calculates a difference between the first quantized block and the second quantized block.

4 Claims, 5 Drawing Sheets

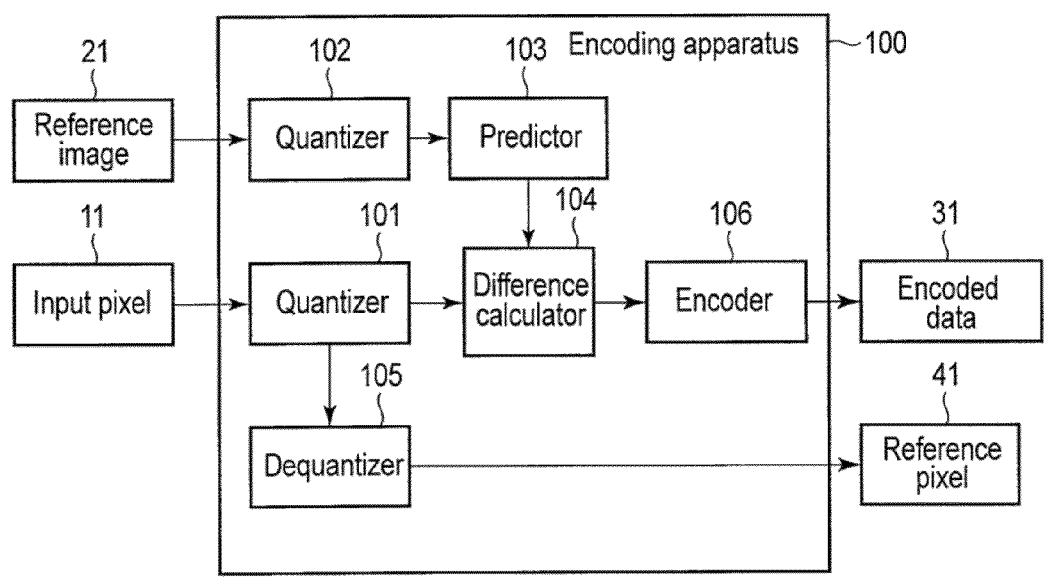
F I G. 1

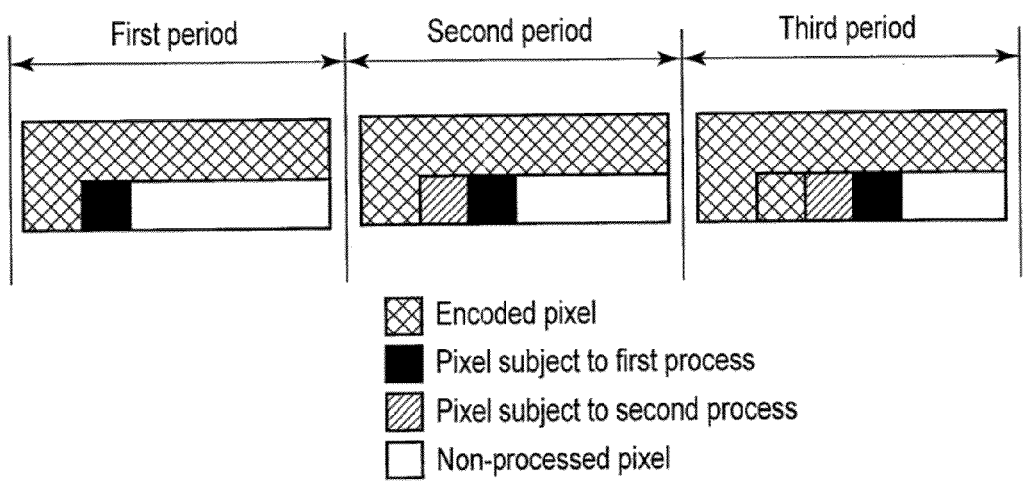
F I G. 5
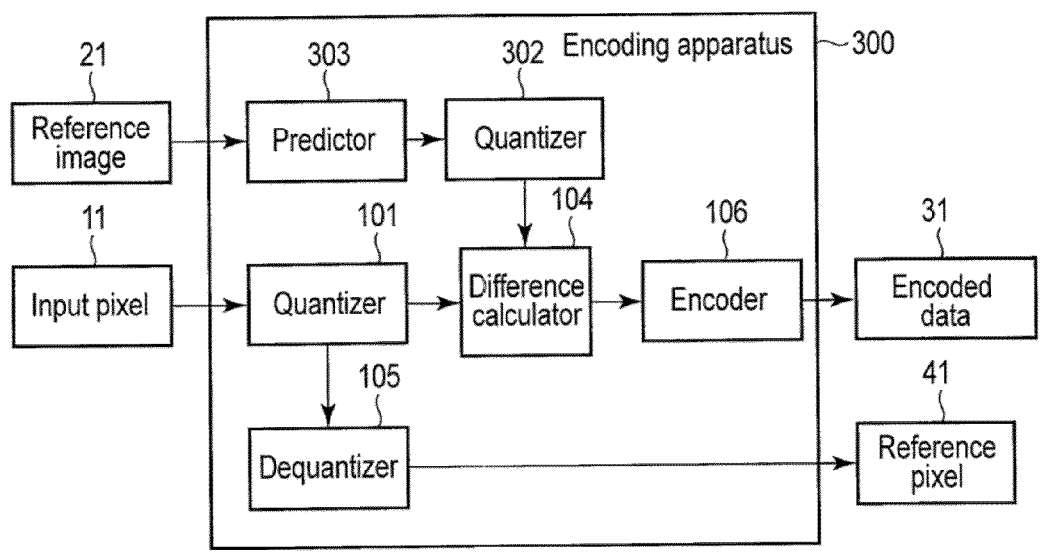
F I G. 6

ND ENCODING
ENCODING APPARATUS AND ENCODING METHOD

CROSS REFERENCE TO RELATED APPLICATIONS

This application is a Continuation Application of PCT Application No. PCT/JP2010/054773, filed Mar. 19, 2010, the entire contents of which are incorporated herein by reference.

FIELD

Embodiments described herein relate generally to image encoding.

BACKGROUND

Usually, when image data or audio data is stored or transmitted, encoding (or compression) is carried out to decrease an amount of the data. One of various encoding techniques that have been proposed is differential pulse code modulation (DPCM) coding.

A common DPCM encoding apparatus calculates a difference between an input pixel and a predicted pixel, and quantizes the difference, and then, performs sequential encoding on the quantized value. The encoding apparatus dequantizes the difference and adds the value with the predicted pixel to generate a local decoded pixel. Further, the encoding apparatus uses the local decoded pixel as a reference pixel to generate a predicted pixel for the next input pixel. In other words, the encoding apparatus performs predictive encoding of the next input pixel only after completing difference calculation, quantization and dequantization of a current input pixel, generation of a reference pixel and generation of a predicted pixel for the next pixel. In the following explanation, the series of processes will be referred to as an encoding loop. When a pixel is synchronized with the clock and input to the encoding apparatus, the higher the input rate is, the shorter the clock period becomes. As a clock period becomes shorter, it becomes difficult to complete the encoding loop in one clock period, and thus, a plurality of clock periods will be required to complete one encoding loop. In other words, a rate of pixel encoding will be lower than a rate of inputting pixels. In this situation, the encoding apparatus may decrease data throughput of a system, and may be a bottleneck for communication.

JP-A 04-225694 (KOKAI) suggests a technique for increasing speed of data processing for a DPCM encoding apparatus. More specifically, the encoding apparatus disclosed in JP-A 04-225694 (KOKAI) also calculates a difference between an input pixel and a predicted pixel, quantizes the difference, and performs sequential encoding on the quantized value. In contrast, the encoding apparatus dequantizes the difference, adds the dequantized difference to the predicted pixel, and generates the predicted pixel for the next input pixel. In other words, according to the encoding apparatus of JP-A 04-225694 (KOKAI), the generation of a reference pixel and the generation of a predicted pixel for the next pixel in the above-described encoding loop can be combined.

BRIEF DESCRIPTION OF THE DRAWINGS

FIG. 1 is a block diagram of the encoding apparatus according to the first embodiment.

FIG. 5 is an explanatory drawing of the series of processes performed by the encoding apparatus shown in FIG. 3.

FIG. 6 is a block diagram of the encoding apparatus according to the third embodiment.

DETAILED DESCRIPTION

Figure 2:
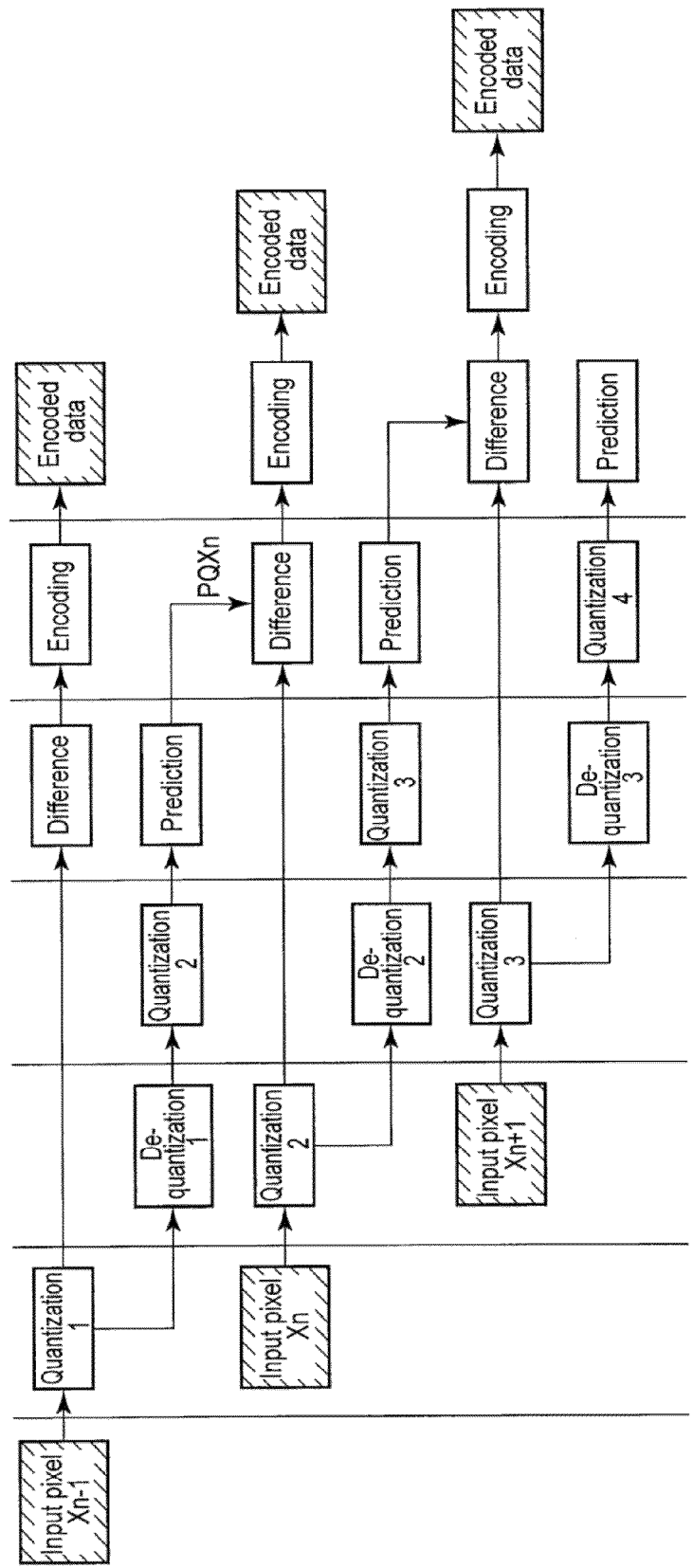
FIG. 2 is an explanatory drawing of the series of processes performed by the encoding apparatus shown in FIG. 1.

The embodiments will be explained with reference to the drawings.

In general, according to one embodiment, an encoding apparatus includes a first quantizer, a second quantizer, a predictor, a calculator, an encoder and a dequantizer. The first quantizer quantizes an input block to obtain a first quantized block. The second quantizer quantizes a reference pixel to obtain at least one quantized value. The predictor predicts each target pixel in the first quantized block using the at least one quantized value and a quantized value of a pixel that is to be decoded preceding the target pixel in decoding order in the first quantized block to obtain a second quantized block. The calculator calculates a difference between the first quantized block and the second quantized block. The encoder encodes the difference. The dequantizer dequantizes the first quantized block to obtain a reference block.

First Embodiment

As shown in FIG. 1, the encoding apparatus 100 comprises a quantizer 101, a quantizer 102, a predictor 103, a difference calculator 104, a dequantizer 105, and an encoder 106. The encoding apparatus 100 performs DPCM coding on an input pixel 11 to generate encoded data 31.

The quantizer 101 quantizes the input pixel 11 in accordance with a predetermined quantizing parameter to obtain a first quantized value. The quantizing parameter is determined by a controller (not shown), for example. The quantizer 101 transfers the first quantized value to each of the difference calculator 104 and the dequantizer 105.

The quantizer 102 quantizes a reference image 21 in accordance with the predetermined quantizing parameter to obtain a quantized reference image. The reference image 21 includes at least one reference pixel necessary for prediction of the input pixel 11. In other words, the quantized reference image corresponds to the at least one quantized reference pixel. The reference image 21 may be stored in a memory (not shown), for example. The quantizer 102 transfers the quantized reference image to the predictor 103.

The predictor 103 predicts the first quantized value of the input pixel 11 based on the quantized reference image to obtain a second quantized value. More specifically, the predictor 103 predicts the first quantized value of the input pixel in accordance with various predicting methods, such as linear prediction and non-linear prediction (for example median prediction for JPEG-LS). The second quantized value corresponds to the quantized value of the predicted pixel of the input pixel 11. The predictor 103 transfers the second quantized value to the difference calculator 104.

The difference calculator 104 calculates a difference between the first quantized value and the second quantized value, and transfers the difference to the encoder 106. The difference corresponds to the quantized value of a predicted error of the input pixel 11. The encoder 106 encodes the difference and outputs it from the apparatus as encoded data 31. The encoder 106 may perform entropy coding (for example, Huffman coding, arithmetic coding, etc.) to reduce the data amount of the difference efficiently.

The dequantizer 105 dequantizes the first quantized value in accordance with the predetermined quantizing parameter to obtain a local decoded pixel corresponding to the input pixel 11. The dequantizer 105 outputs the local decoded pixel as a reference pixel 41 based on the input pixel 11. The reference pixel 41 is stored in a memory (not shown), and can be used to predict the next input pixel 11 as a part or whole of the reference image 21.

In the following, the sequential process performed by the encoding apparatus will be explained in reference to FIG. 2. The horizontal partitions in FIG. 2 conceptually show a clock period or other cycles. In FIG. 2, an input pixel $X_n$ indicates an nth input pixel. A second quantized value $PQX_n$ indicates a quantized value of a predicted pixel of the input pixel $X_n$. In FIG. 2, the numbers accompanied with the labeling of "quantized" and "dequantized" are index to identify accuracy of quantization. In other words, if quantized or dequantized values have a same index, the quantization accuracy of the values are the same, whereas quantized or dequantized values have different indexes, the quantization accuracy of the values may not be the same. For simplicity, in FIG. 2, a local decoded pixel of a current input pixel is used as a reference pixel to predict a predicted pixel of the next pixel. However, in reality, the operation of the encoding apparatus 100 is not limited to the manner as illustrated in FIG. 2.

The quantizer 101 quantizes an input pixel $X_{n-1}$ (quantization 1) to obtain a first quantized value. The first quantized value is transferred in parallel to the difference calculator 104 and the dequantizer 105. At a first path (a path including the difference calculator 104), the difference calculator 104 calculates a difference between the first quantized value and a second quantized value ($PQX_{n-1}$), and transfers the difference to the encoder 106. If the reference pixel 41 based on a previous input pixel $X_{n-2}$ is used as a part of the reference image 21 of the current input pixel $X_{n-1}$, quantization, dequantization, and prediction of the previous input pixel $X_{n-2}$ must be completed before the difference calculator 104 starts calculating a difference. The encoder 106 encodes a difference and outputs encoded data. In contrast, at the second path that is in parallel to the first path, the dequantizer 105 dequantizes the first quantized value (dequantization 1) to obtain the reference pixel 41 based on the input pixel $X_{n-1}$. The reference image 21 including the reference pixel 41 is transferred to the quantizer 102. The quantizer 102 quantizes the reference image 21 (quantization 2) and transfers the value to the predictor 103. The predictor 103 generates a second quantized value ($PQX_n$) using the quantized reference image, and transfers the second quantized value to the difference calculator 104.

After completing the quantization of the input pixel $X_{n-1}$ (quantization 1), the input pixel $X_n$ is transferred to the quantizer 101. The quantizer 101 quantizes the input pixel $X_n$ (quantization 2) to obtain a first quantized value. The first quantized value is transferred in parallel to the difference calculator 104 and the dequantizer 105. At the first path, the difference calculator 104 calculates a difference between the first quantized value and the second quantized value ($PQX_n$), and transfers the difference to the encoder 106. The encoder 106 encodes the difference and outputs encoded data. In contrast, at the second path in parallel to the first path, the dequantizer 105 dequantizes the first quantized value (dequantization 2) to obtain the reference pixel 41 based on the input pixel $X_n$. The reference image 21 including the reference pixel 41 is transferred to the quantizer 102. The quantizer 102 quantizes the reference image 21 (quantization 3), and transfers the quantized reference image to the predictor 103. The predictor 103 generates a second quantized value ($PQX_{n+1}$) using the quantized reference image After completing the quantization of the input pixel $X_{n-1}$ (quantization 2), the input pixel $X_n$ is transferred to the quantizer 101. The quantizer 101 quantizes the input pixel $X_{n+1}$ (quantization 3) to obtain a first quantized value. The first quantized value is transferred in parallel to the difference calculator 104 and the dequantizer 105. At the first path, the difference calculator 104 calculates a difference between the first quantized value and the second quantized value ($PQX_{n+1}$), and transfers the difference to the encoder 106. The encoder 106 encodes the difference and outputs encoded data. In contrast, at the second path in parallel to the first path, the dequantizer 105 dequantizes the first quantized value (dequantization 3) to obtain the reference pixel 41 based on the input pixel $X_{n+1}$. The reference image 21 including the reference pixel 41 is transferred to the quantizer 102. The quantizer 102 quantizes the reference image 21 (quantization 4), and transfers the quantized reference image to the predictor 103. The predictor 103 generates a second quantized value ($PQX_{n+2}$) using the quantized reference image.

As can be seen from FIGS. 1 and 2, a feedback loop does not exist in the encoding process at the encoding apparatus 100. In other words, any of the elements in the encoding apparatus 101 does not require feedback input based on outputs in the past. Accordingly, basically, as soon as a processing of a current input pixel at any of the elements in the encoding apparatus 100 is completed, the element can begin a processing of the next input pixel.

As explained in the above, there is no feedback loop in the encoding process at the encoding apparatus according to the first embodiment. Accordingly, the encoding apparatus according to the present embodiment can capture an input pixel sequentially and perform parallel processing. In other words, the encoding apparatus according to the present embodiment can operate in a shorter clock period (high clock frequency) than a conventional encoding apparatus, and therefore, high-speed encoding can be achieved.

Second Embodiment

Figure 3:
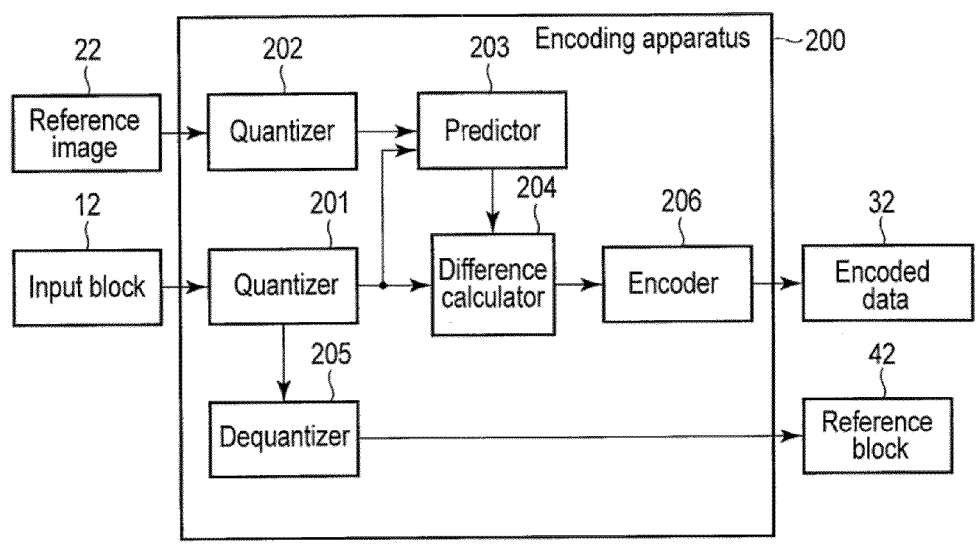
FIG. 3 is a block diagram of the encoding apparatus according to the second embodiment.

As shown in FIG. 3, the encoding apparatus 200 according to the second embodiment comprises a quantizer 201, a quantizer 202, a predictor 203, a difference calculator 204, a dequantizer 205 and an encoder 206. The encoding apparatus 200 performs DPCM coding on an input block 12 to generate encoded data 32. In the following explanation, the same reference numerals will be used to refer to the same elements in FIG. 1, and the different elements will be mainly explained.

The quantizer 201 quantizes the input block 12 in accordance with a predetermined parameter to obtain a first quantized block. The input block 12 includes a plurality of input pixels. In other words, the first quantized block includes quantized values for the plurality of input pixels. The quantizing parameter is determined by a controller (not shown), for example. The quantizer 201 transfers the first quantized block to each of the predictor 203, the difference calculator 204, and the dequantizer 205.

The quantizer 202 quantizes a reference image 22 in accordance with the above predetermined quantizing parameter to obtain the quantized reference image. The reference image 22 includes at least one reference pixel necessary for prediction of the plurality of input pixels included in the input block 12. In other words, the quantized reference image corresponds to at least one quantized reference pixel. The reference image 22 may be stored in a memory (not shown), for example. The quantizer 202 transfers the quantized reference image to the predictor 203.

The predictor 203 predicts the plurality of input pixels included in the first quantized block of the input block 12 to obtain a second quantized block. More specifically, the predictor 203 predicts each of target pixels included in the first quantized block of the input block 12 in accordance with various predicting methods, such as linear prediction and non-linear prediction (for example, median prediction in JPEG-LS), etc. The details of the reference pixel available for the predictor 203 to predict target pixels will be explained later. The second quantized block corresponds to quantized values of predicted pixels of the plurality of input pixels included in the input block 12. The predictor 203 transfers the second quantized block to the difference calculator 204.

The difference calculator 204 calculates a difference between the first quantized block and the second quantized block, and transfers it to the encoder 206. The difference corresponds to quantized values of predicted errors of the plurality of input pixels included in the input block 12. The encoder 206 encodes the difference, and outputs it from the apparatus as encoded data 32. The encoder 206 may perform entropy coding (for example, Huffman coding, arithmetic coding, etc.) to efficiently reduce the data amount of the difference.

The dequantizer 205 dequantizes the first quantized block in accordance with the above predetermined quantizing parameter to obtain a local decoded block corresponding to the input block 12. The dequantizer 205 outputs the local decoded block as a reference block 42 based on the input block 12. The reference block 42 includes a plurality of reference pixels corresponding to the plurality of input pixels included in the input block 12. The plurality of reference pixels are stored in a memory (not shown) for example, and can be used to predict the next input block 12 as a part or whole of the reference image 22.

In the following, reference pixels available for the predictor 203 to predict each target pixel in the first quantized block of the input block 12 will be explained. The predictor 203 predicts the plurality of input pixels in the first quantized block of the input block 12 individually. For predicting each target pixel in the first quantized block of the input block 12, the predictor 203 can use the quantized reference image and a quantized value of a pixel which is to be decoded preceding the target pixel in decoding order in the first quantized block. For example, if decoding is performed in the order of raster, the decoding apparatus cannot refer to a pixel existing at a row lower than a row of a decoding target pixel in the same block, or at the right side of the same row as the decoding target pixel (in other words, a pixel to be decoded later than a decoding target pixel). For this reason, the predictor 203 refers to a quantized value of a pixel to be decoded before a target pixel is decoded when the first quantized block is used to predict the target pixel in the input block 12. For the same reason, the predictor 203 cannot refer to a quantized value of the target pixel itself in order to predict the target pixel.

Figure 4:
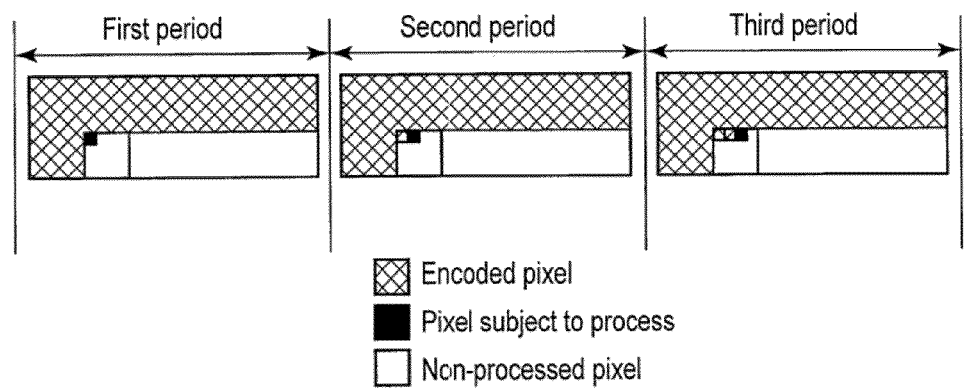
FIG. 4 is an explanatory drawing of the series of processes performed by a conventional encoding apparatus.

In the following, the sequential processes performed by a conventional DPCM encoding apparatus will be explained with reference to FIG. 4, and the sequential processes performed by the encoding apparatus 200 according to the present embodiment will be explained with reference to FIG. 5.

A conventional DPCM encoding apparatus captures an input image by pixel unit to perform DPCM coding. In other words, the conventional DPCM encoding apparatus, as shown in FIG. 4, performs DPCM coding on a first input pixel during a first period, and performs DPCM coding on a second input pixel which is decoded after the first input pixel is decoded during the second period, and performs DPCM coding on a third input pixel which is decoded after the second input pixel is decoded during a third period.

In contrast, the encoding apparatus 200 according to the present embodiment captures an input image by block units to perform DPCM coding. More specifically, the encoding apparatus 200, as shown in FIG. 5, performs a first process on a first input block during a first period, and performs the first process on the second input block which is decoded after the first input block is decoded while performing a second process on the first input block during a second period, and performs the first process on a third input block which is decoded after the second input block is decoded while performing the second process on the second block during a third period. Herein, the first process refers to the process performed by the quantizer 201, the quantizer 202 and the dequantizer 205. The second process refers to the process performed by the predictor 203, the difference calculator 204 and the encoder 206. During the first period, quantization of the first input block, quantization of a reference image, and generation of a reference block based on the first input block are completed. Thus, when the second period begins, as all the reference pixels (all quantized values of the reference pixels) necessary for prediction of the first input block have been prepared, the predictor 203 can immediately perform prediction of the plurality of input pixels included in the first input block. Further, when the second period begins, as the reference block based on the first input block has already been prepared, the encoding apparatus 200 can immediately perform the first process on the second input block.

As explained in the above, the encoding apparatus according to the second embodiment sequentially captures an input image on a block-by-block basis to perform DPCM coding. Accordingly, the encoding apparatus according to the present embodiment can perform parallel process on a plurality of pixels included in a block; therefore, high-rate encoding is possible. For simplicity, the explanation of the present embodiment above is focused on the process on a block-by-block basis; however, the present embodiment is easily applicable to a group of pixels other than blocks.

Third Embodiment

As shown in FIG. 6, the encoding apparatus 300 according to the third embodiment comprises a quantizer 101, a quantizer 302, a predictor 303, a difference calculator 104, a dequantizer 105 and an encoder 106. The encoding apparatus 300 performs DPCM coding on an input pixel 11 to generate encoded data 31. In the following explanation, the same reference numerals will be used in FIG. 6 to refer to the same elements shown in FIG. 1, and the elements different from those in FIG. 1 will be mainly explained.

The predictor 303 predicts the input pixel 11 based on a reference image 21 to obtain a predicted pixel. More specifically, the predictor 303 performs prediction in accordance with various predicting methods, such as linear prediction and non-linear prediction (for example, median prediction in JPEG-LS), etc. The predictor 303 transfers the predicted pixel to the quantizer 302.

The quantizer 302 quantizes the predicted pixel in accordance with the quantizing parameter same as the one used by the quantizer 101 to obtain the aforementioned second quantized value. The quantizer 302 transfers the second quantized value to the difference calculator 104.

As explained above, the encoding apparatus according to the third embodiment is the same as the encoding apparatus according to the first embodiment except for the order of the quantizer 102 (302) and the predictor 103 (303). Accordingly, the encoding apparatus according to the present embodiment can obtain the effect similar to the effect obtained by the encoding apparatus according to the first embodiment. Further, since a reference pixel before quantization is used for the prediction in the present embodiment, more accurate prediction can be realized.

It is possible to treat each of the combination of the quantizer 102 and the predictor 103 and the combination of the quantizer 302 and the predictor 303 collectively as a predicting and quantizing unit. The predicting and quantizing unit performs prediction and quantization using the reference image 21 to obtain a second quantized value. At a predicting and quantizing unit, an order of prediction and quantization can be arbitrarily determined.

Fourth Embodiment

Figure 7:
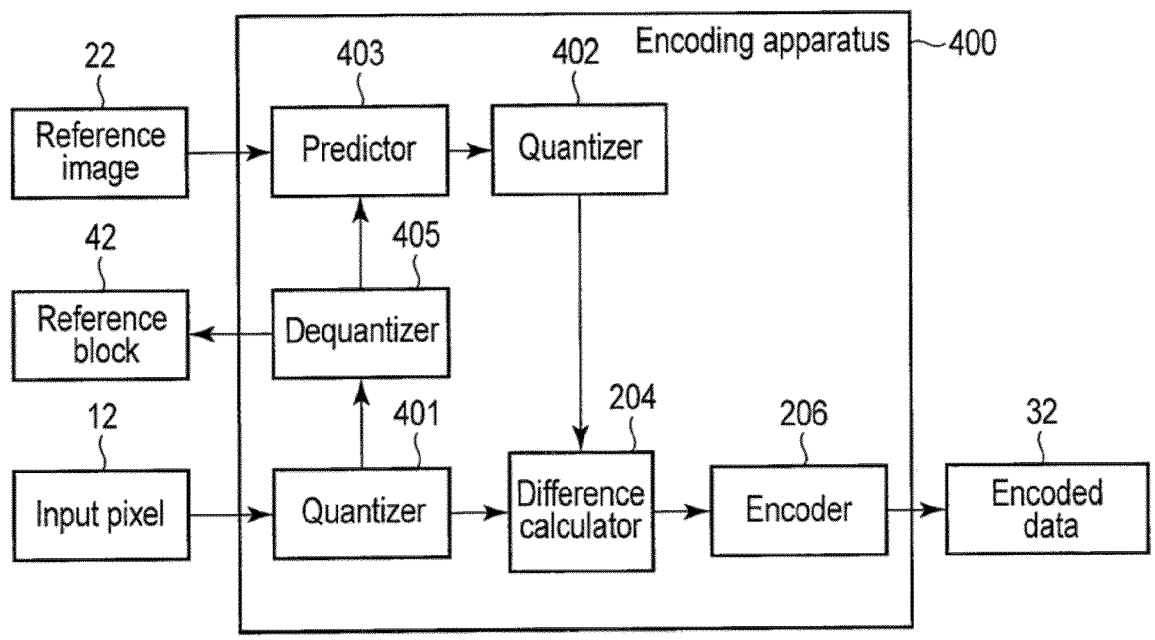
FIG. 7 is a block diagram of the encoding apparatus according to the fourth embodiment.

As shown in FIG. 7, the encoding apparatus 400 according to the fourth embodiment comprises a quantizer 401, a quantizer 402, a predictor 403, a difference calculator 204, a dequantizer 405, and an encoder 206. The encoding apparatus 400 performs DPCM coding on an input block 12 to generate encoded data 32. In the following explanation, the same reference numerals will be used to refer to the same elements in FIGS. 3 and 7, and the differences between FIGS. 3 and 7 will be mainly explained.

The quantizer 401 quantizes the input block 12 in accordance with a predetermined parameter to obtain a first quantized block. The quantizer 401 transfers the first quantized block to the difference calculator 204 and the dequantizer 405.

The dequantizer 405 dequantizes the first quantized block in accordance with the predetermined quantizing parameter to obtain a local decoded block corresponding to the input block 12. The dequantizer 405 outputs the local decoded block as a reference block 42 to the predictor 403 and a memory (not shown), etc.

The predictor 403 predicts a plurality of input pixels included in the input block 12 to obtain a predicted block. More specifically, the predictor 403 performs prediction in accordance with various predicting methods, such as linear prediction and non-linear prediction (for example, median prediction in JPEG-LS), etc. The details of a reference pixel that can be used for prediction of each target pixel by the predictor 403 will be described later. The predicted block corresponds to predicted pixels of a plurality of input pixels included in the input block 12. The predictor 403 transfers the predicted block to the quantizer 402.

The quantizer 402 quantizes a predicted block in accordance with the predetermined quantizing parameter to obtain the aforementioned second quantized block. The quantizer 402 transfers the second quantized block to the difference calculator 204.

In the following, a reference pixel that can be used by the predictor 403 to predict each target pixel in the input block 12 will be explained. The predictor 403 individually predicts a plurality of input pixels included in the input block 12. The predictor 403 can use the reference image 22 and a value of a pixel that is to be decoded preceding a target pixel in decoding order in the reference block 42 to predict each target pixel in the input block 12. For example, if decoding is performed in the order of raster, the decoding apparatus cannot refer to a pixel existing at a row lower than a row of a decoding target pixel in the same block, or at the right side of the same row as the decoding target pixel (in other words, a pixel to be decoded after decoding a decoding target pixel). For this reason, the predictor 403 refers to a value of a pixel to be decoded earlier than a target pixel when the reference block 42 is used to predict the target pixel in the input block 12. For the same reason, the predictor 403 cannot refer to a value of a target pixel itself in order to predict the target pixel.

As explained in the above, the encoding apparatus according to the fourth embodiment corresponds to the encoding apparatus according to the second embodiment except for the order of the quantizer 202 (402) and the predictor 203 (403) and other elements being conformed thereto. According to the present embodiment, the same effect that is achieved by the encoding apparatus according to the second embodiment can be achieved. Furthermore, a reference pixel before quantization is used to perform prediction in the present embodiment, a high-accurate prediction can be realized.

The processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An encoding apparatus comprising:
    a first quantizer configured to quantize an input block in a target image to obtain a first quantized block;
    a second quantizer configured to quantize a reference pixel to obtain at least one quantized value;
    a predictor configured to predict each target pixel in the first quantized block using the at least one quantized value and a quantized value of a pixel that is to be decoded preceding the target pixel in decoding order in the first quantized block to obtain a second quantized block;
    a calculator configured to calculate a difference between the first quantized block and the second quantized block;
    an encoder configured to encode the difference; and
    a dequantizer configured to dequantize the first quantized block to obtain a reference block.

2. An encoding apparatus comprising:
a first quantizer configured to quantize an input block to obtain a first quantized block;
a dequantizer configured to dequantize the first quantized block to obtain a reference block;
a predictor configured to predict each target pixel in the input block using a reference pixel and a value of a pixel that is to be decoded preceding the target pixel in decoding order in the reference block to obtain a predicted block;
a second quantizer configured to quantize the predicted block to obtain a second quantized block;
a calculator configured to calculate a difference between the first quantized block and the second quantized block; and
an encoder configured to encode the difference.

3. An encoding method comprising:
quantizing, via a processor, an input block in a target image to obtain a first quantized block;
quantizing, via the processor, a reference pixel to obtain at least one quantized value;
predicting, via the processor, each target pixel in the first quantized block using the at least one quantized value and a quantized value of a pixel that is to be decoded preceding the target pixel in decoding order in the first quantized block to obtain a second quantized block;
calculating, via the processor, a difference between the first quantized block and the second quantized block;
encoding, via the processor, the difference; and
dequantizing, via the processor, the first quantized block to obtain a reference block.

4. An encoding method comprising:
quantizing, via a processor, an input block to obtain a first quantized block;
dequantizing, via the processor, the first quantized block to obtain a reference block;
predicting, via the processor, each target pixel in the input block using a reference pixel and a value of a pixel that is to be decoded preceding the target pixel in decoding order in the reference block to obtain a predicted block;
quantizing, via the processor, the predicted block to obtain a second quantized block;
calculating, via the processor, a difference between the first quantized block and the second quantized block; and
encoding, via the processor, the difference.

* * * * *